United States Patent [19]
Cunningham et al.

[11] 3,886,887
[45] June 3, 1975

[54] SYSTEM FOR CONTROLLING THE POSITION OF A FLOATING VESSEL

[75] Inventors: Sinclair Upton Cunningham; Douglas Jackson, both of East Kilbride, Scotland

[73] Assignee: The Secretary of State for Defence in Her Britannic Majesty's Government of the United Kingdom of Great Britain and Northern Ireland, London, England

[22] Filed: Feb. 5, 1973

[21] Appl. No.: 329,401

[30] Foreign Application Priority Data
Feb. 4, 1972   United Kingdom............... 5249/72

[52] U.S. Cl............. 114/230; 114/144 B; 235/150.2
[51] Int. Cl.............................................. B63b 21/00
[58] Field of Search............ 114/230, 144 B, 144 R; 254/173, 172; 104/206 R; 235/150.2, 151, 151.32

[56] References Cited
UNITED STATES PATENTS

| | | |
|---|---|---|
| 3,145,683 | 8/1964 | Kolb et al..................... 114/144 B |
| 3,148,653 | 9/1964 | Shatto, Jr. et al............. 114/144 B |
| 3,167,049 | 1/1965 | Foster........................... 114/144 B |
| 3,211,121 | 10/1965 | Dozier........................... 114/144 B |
| 3,596,070 | 7/1971 | McCool et al................. 114/206 R |
| 3,613,625 | 10/1971 | Rudelius et al................ 114/230 |
| 3,739,738 | 6/1973 | Cavil............................. 114/144 R |

*Primary Examiner*—George E. A. Halvosa
*Assistant Examiner*—Edward R. Kazenske
*Attorney, Agent, or Firm*—Cameron, Kerkam, Sutton, Stowell & Stowell

[57] ABSTRACT

A system for controlling the position of a floating vessel consisting of propulsion apparatus capable of moving the vessel, a logic device controlling the propulsion apparatus, and position detecting apparatus for providing output signals related to any algebraic difference(s) between the actual position and heading of the vessel and the required position and heading in relation to a reference datum, arranged so that output signals are fed from the position detecting apparatus to the logic device to cause the logic device to control the propulsion apparatus whereby the position of the vessel is altered in such a manner that the algebraic difference(s) is reduced in magnitude.

5 Claims, 11 Drawing Figures

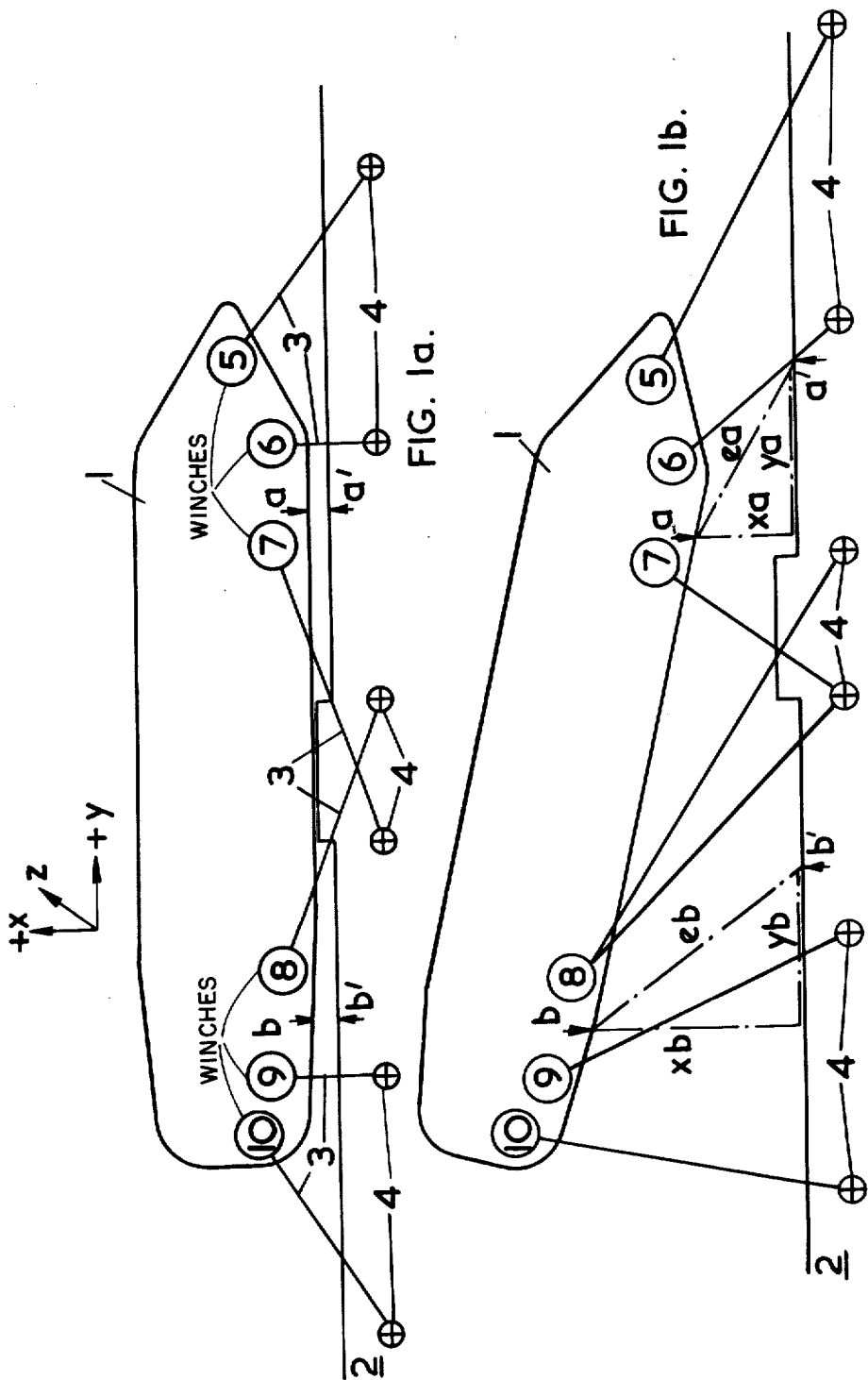

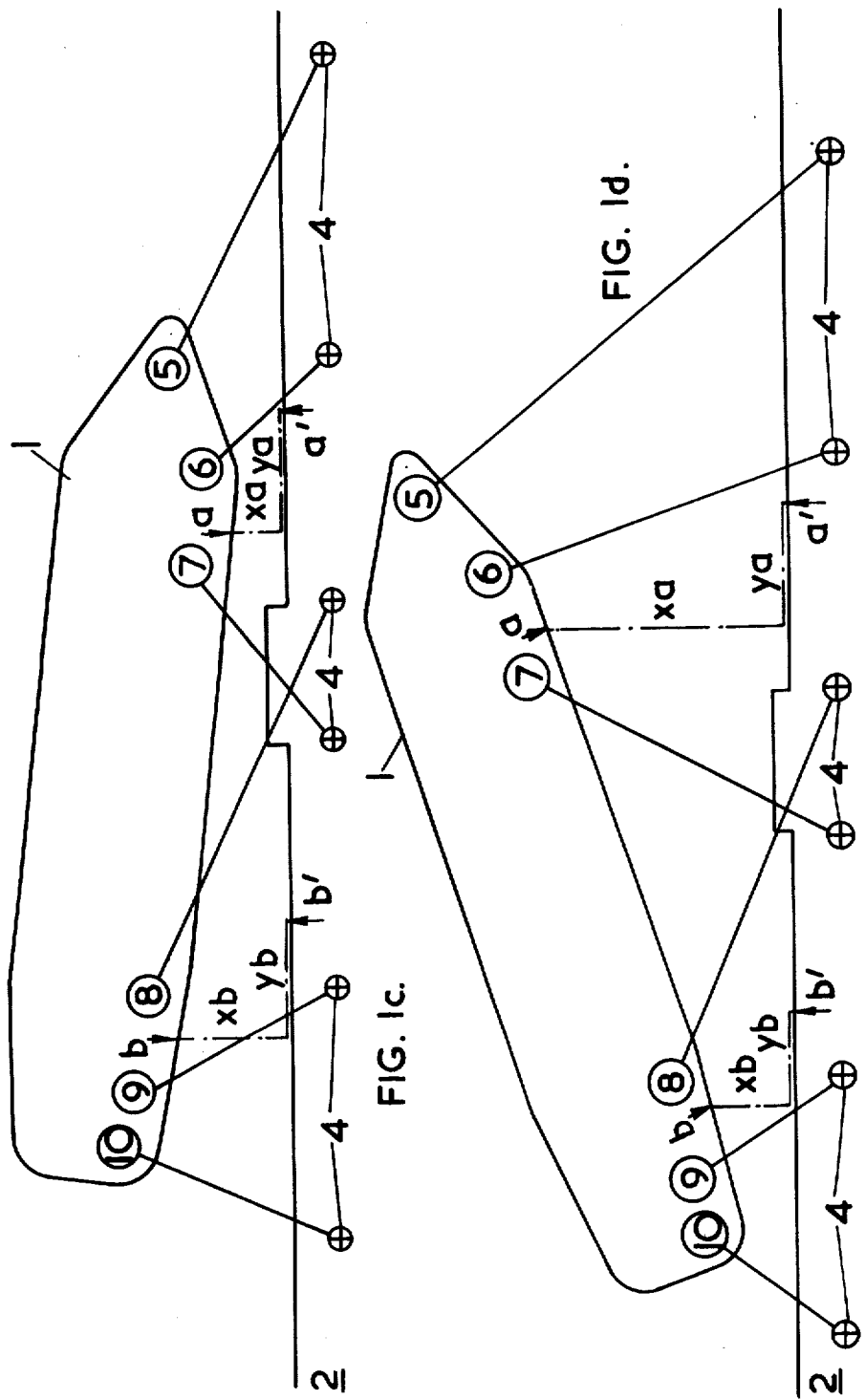

SYSTEM FOR CONTROLLING THE POSITION OF A FLOATING VESSEL

This invention relates to a system for controlling the position of a floating vessel, such as a ship mooring system.

The main functions of such a system are to assist the safe docking of the vessel, to provide facilities for emergency quick release, and to retain the vessel alongside a jetty or the like within a certain range of positions, which is especially important with, for example, a tanker when the positional tolerance is determined by the flexibility of the cargo hose and hose coupling, and wind and sea forces on the vessel may be very great.

It is known to moor a vessel to a jetty or to buoys by means of ropes or cables each having one end attached to an automatic tensioning winch; such an arrangement eliminates the need for manual adjustment of the ropes when the tidal or ballast conditions change, but problems arise when an automatic winch is used to control a backspring or head or stern rope. For example the difference between the pre-set tension and the tension at which a winch slacks or heaves is small, which is unacceptable since this difference limits the effective pull to correct the position of the vessel. Another disadvantage of automatic winches is that the pre-set tension must be high, which reduces the life of the cable or rope.

According to the invention, a system for controlling the position of a moored floating vessel consists of propulsion means capable of moving the vessel, logic means controlling the propulsion means, and position detecting apparatus for providing output signals related to any difference(s) between actual position and heading of the vessel and the required position and heading in relation to a reference datum, arranged so that said output signals are fed from the position detecting means to the logic means to cause said logic means to control the propulsion means whereby the position of the vessel is altered in such a manner that the said difference(s) is reduced in magnitude.

Preferably the position detecting apparatus comprises a base fixable to the vessel, on said base a head pivoted so as to be able to turn in two planes mutually at right angles, means for producing signals related in sign and magnitude to any change in angle of the pivoted head from a predetermined angle in either said plane, a cord having a first end so located that the cord can be guided so as to pass through said pivoted head and having a second end adapted to be fixed to the said reference datum, means for maintaining said cord in tension whereby the pivoted head can turn in response to any change in angular direction of the cord therethrough, and means for producing a signal related to the length of any portion of the cord lying at any time between the second end thereof and the pivoted head. The cord may be made of hemp or metal wire or plastic or any other suitable material.

Optionally the pivoted head is arranged to drive a first potentiometer which can give an electrical output signal related to the angular direction of the pivoted head in a horizontal plane and to drive a second potentiometer which can give an electrical output signal related to the angular direction of the pivoted head in a vertical plane. A third potentiometer may be provided which can be driven from the cord and which can give an electrical output signal related to the length of any portion of the cord lying at any time between the second end thereof and the pivoted head.

Alternatively the position detecting apparatus may be of the non-contacting type, such as short range radar apparatus, having a transmitter receiver mounted on the vessel and a reflector at the reference datum, or vice versa.

The reference datum may be sited on a jetty or on one or more buoys to which, or adjacent to which, a vessel can be moored.

Usually the propulsion means for moving the vessel is an arrangement of a number of cables linking the vessel and the jetty or buoys on which the reference datum is sited and a corresponding number of power winches which can heave or slack the respective cables in conformity with control signals from the logic means, whereby the actual position and heading of the vessel is brought to and maintained at the required relationship to the reference datum. Alternatively the propulsion means may be the main propulsion machinery of the vessel having at least two independently controllable driving propellors or jets, said logic means controlling the propulsion means whereby the actual position and heading of the vessel is brought to and maintained at the required relationship to the reference datum.

Optionally the logic means is of the electrical kind and the power winches are of the hydraulic kind and are controllable through electro-hydraulic valves.

The invention will now be described by way of example only with reference to the accompanying drawings in which:

FIG. 1A illustrates schematically a ship in docked position; and

FIGS. 1B, 1C, 1D illustrate three types of positional and heading error;

Figure 6:
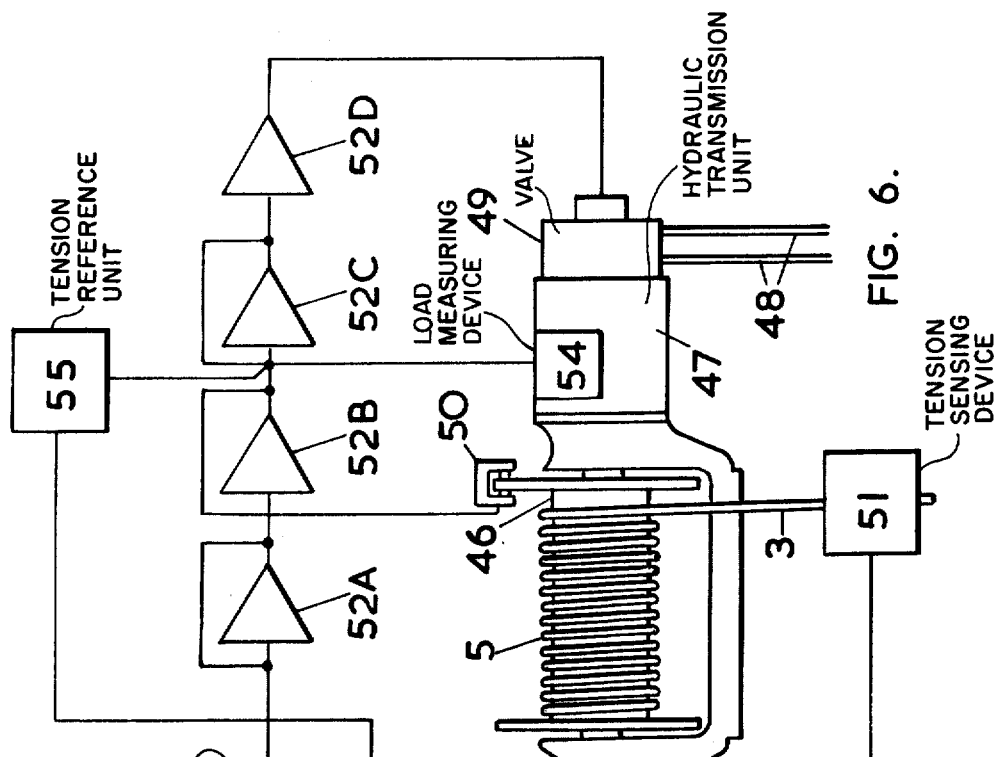
FIG. 6 illustrates schematically the winch servo unit.

In FIG. 1A a ship 1 is moored to a jetty 2 by mooring cables 3 attached on the jetty 2 to bollards 4 and on the ship 1 to servo-controlled winches 5, 6, 7, 8, 9, 10. The position of the ship relative to the jetty is monitored at two points $a$ and $b$ on the ship, adjacent to two reference points $a^1$ and $b^1$ on the jetty 2, and any positional and heading error can be resolved with respect to the axes $x, y, z$ shown in the Figure.

In FIGS. 1B, 1C and 1D the errors in the position and heading of the ship 1 with respect to datum points $a^1$ and $b^1$ are shown resolved along the $x$ and $xb,y$ axes to give errors $xa, ya$ and $yb$ respectively. It is assumed for the moment that there is no error in the Z direction. The logic system is arranged so that the greatest error is reduced first; ie the winches controlling the appropriate mooring cables 3 are arranged to heave or slack. In FIG. 1B the greatest error is xb and winches 8, 9 and 10 would heave. In FIG. 1C the greatest errors are ya and yb and winches 5, 6, 8 and 9 would heave while winches 7 and 10 would slack. In FIG. 1D the greatest error is xa and winches 5, 6 and 7 would heave. After correction of the greatest error, the logic circuit is arranged to correct the next largest error and so on.

The mooring plan of FIG. 1 includes the minimum number of mooring cables for clarity and is a typical plan. Different and more complex mooring plans can be used with appropriate alterations to the logic system.

Figure 2:
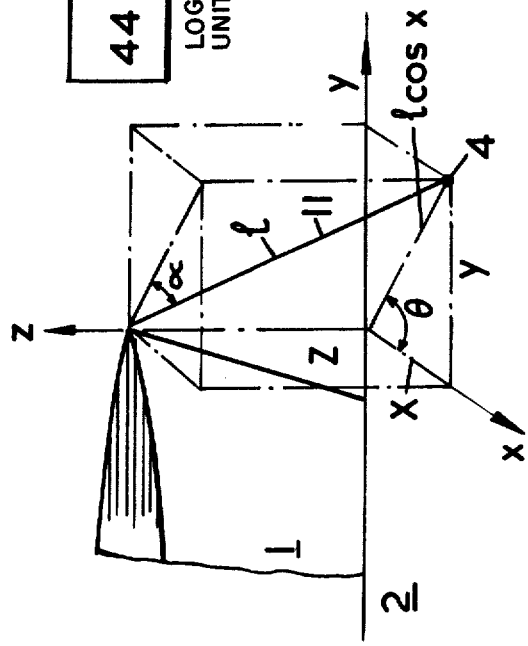
FIG. 2 illustrates a ship mooring system showing the resolution of the ship's position into angular measurements.

In FIG. 2, a ship 1 is attached to a reference point 4 (corresponding to reference point $a^1$ or $b^1$) on the jetty 2 by a measuring cord 11 of length 1 at an angle of depression $\alpha$ from the x-y horizontal plane and at an angle of deviation $\theta$ in the x-z plane. The resolution of the measuring cord 11 onto the x axis is $x = l\cos \alpha \cos \theta$, onto the y axis is $Y = l\cos \alpha \sin\theta$ and onto the z axis is $Z = l\sin\theta$.

Thus by measuring any change in the angles $\alpha$ and $\theta$ and in the length $l$, the corresponding change in position and heading of the ship can be measured.

Figure 3A:
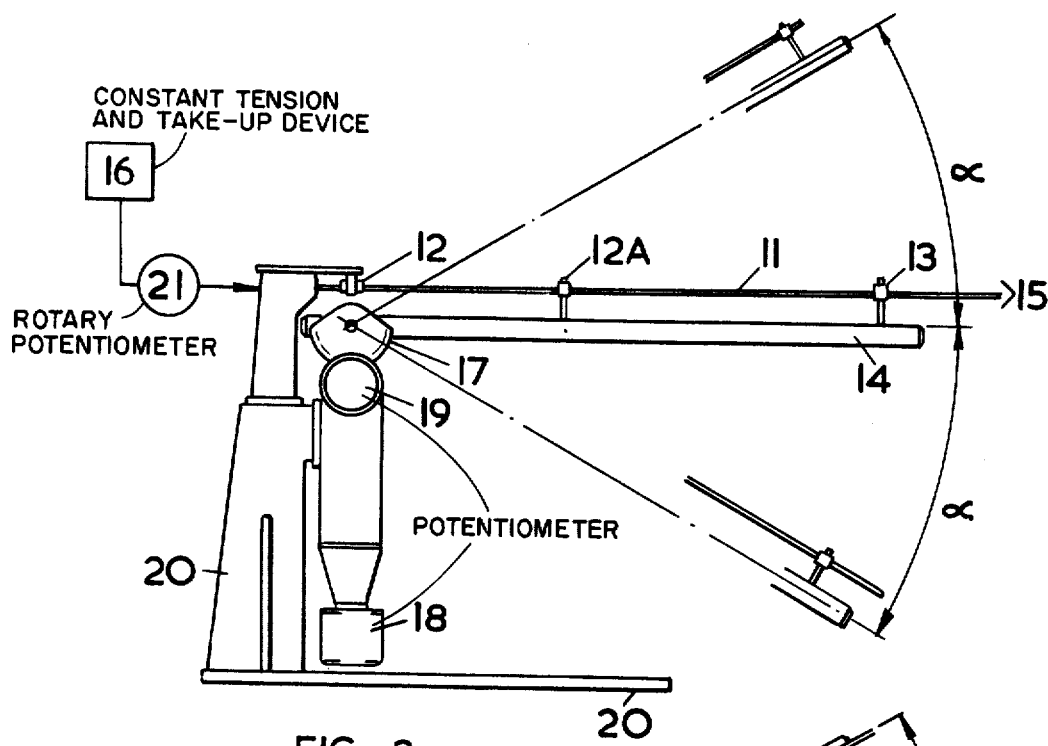
FIGS. 3A and 3B are respectively elevation and plan of a base and pivoted head for mounting on a ship.
Figure 3B:
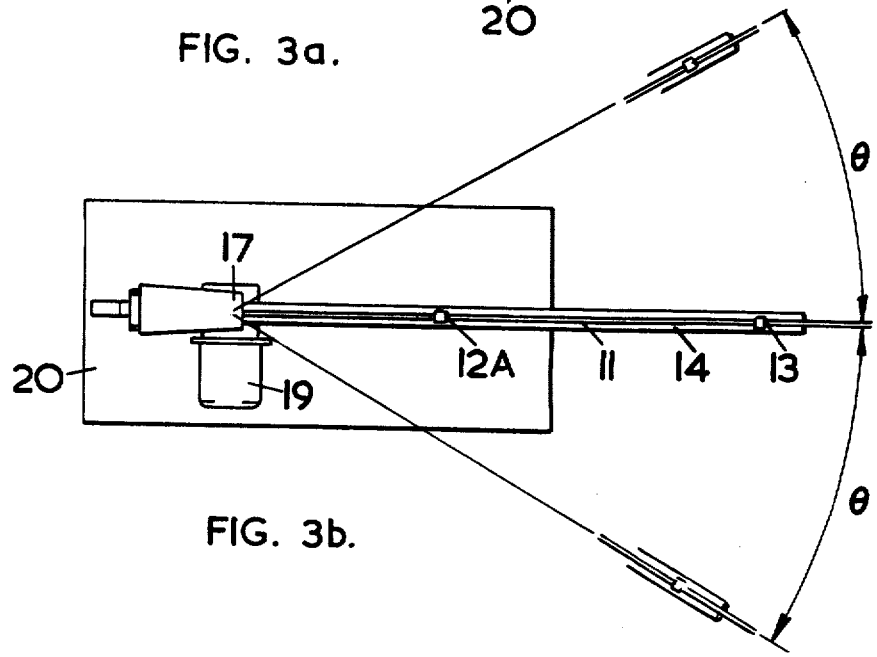

In FIGS. 3A and 3B, illustrating the pivoted head mounted on the ship, a measuring cord 11 is arranged to run through three guides 12, 12A and 13 attached to a metal bar 14. The end of the cord 11 in the direction of arrow 15 is attached to a reference point on shore (point 4 in FIG. 2) and the distance between the reference point and the guide 12 defines length $l$. The other end of the cord 11 is attached to a hydraulic constant tension and take-up device 16 and is arranged so that any lengthwise movement of the said cord imparts a corresponding movement to the movable contact of a rotary potentiometer 21, which is conveniently mounted on a base 20 situated on the ship. The bar 14 is pivoted at 17 and with the cord 11 can move in a horizontal plane through an angle $\theta$ and in a vertical plane through an angle $\alpha$. Any change in the angle $\theta$ is measured by a sine-cosine potentiometer 18 and any change in the angle $\theta$ is measured by a sine-cosine potentiometer 19, the potentiometers 18 and 19 being attached to the base 20. Any change in length of the cord 11 between the guide 12 and the reference point 4 (FIG. 2) is measured by the rotary potentiometer 21 and the potentiometers 18, 19 and 21 can be initially set to give signals related to the angles $\alpha$ and $\theta$ and the length $l$.

A pivoted head such as that described above is situated at each of positions $a$ and $b$ on the ship 1.

Figure 4:
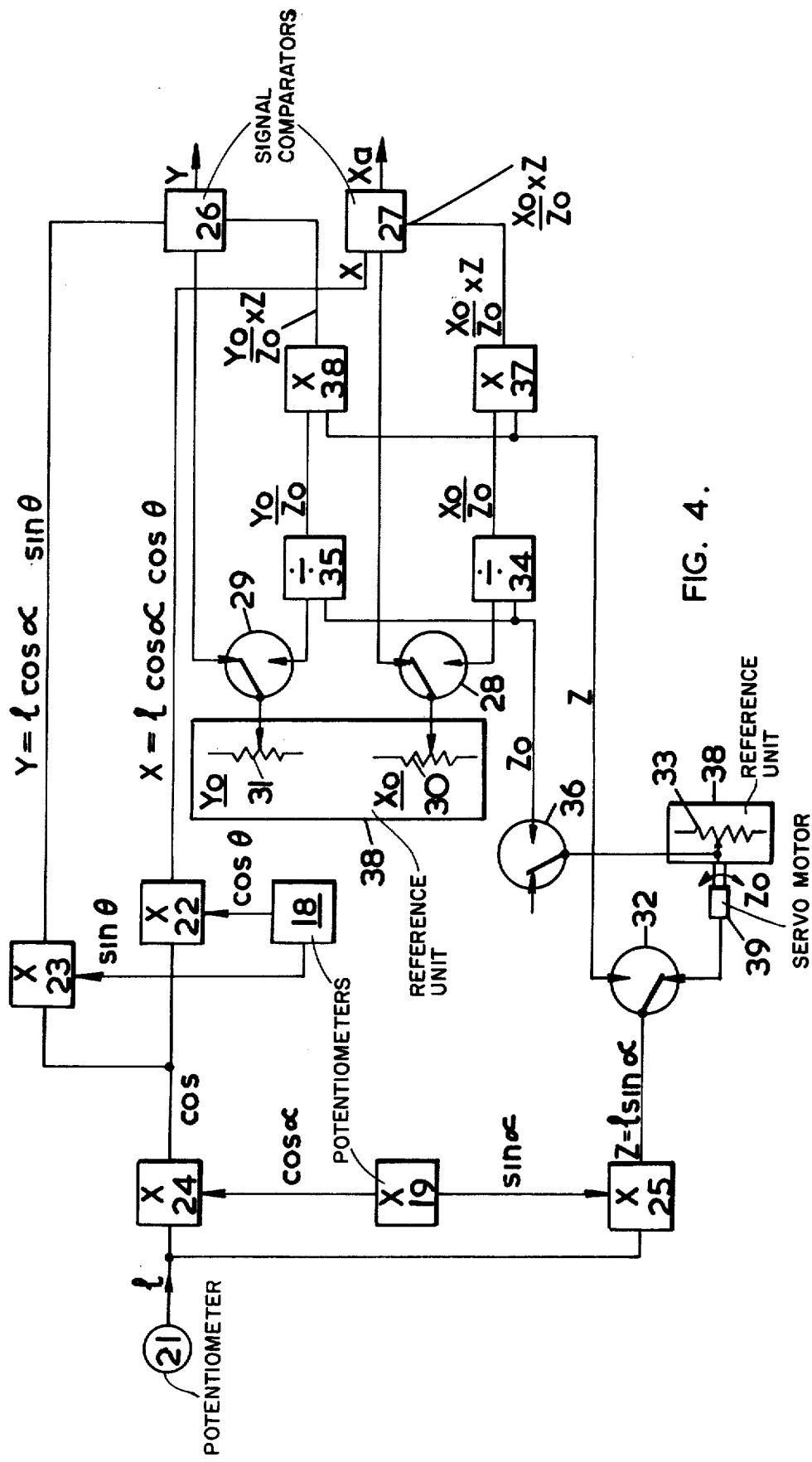
FIG. 4 illustrates diagrammatically an electrical resolver circuit by which signals from the pivoted head are converted to signals related to the positional errors in relation to the reference datum.

In FIG. 4, which illustrates a resolver unit 42, the potentiometer 18 supplies cos $\theta$ and sin $\theta$ signals respectively to multipliers 22 and 23 and potentiometer 19 supplies cos$\alpha$ and sin$\alpha$ signals to multipliers 24 and 25 respectively. A signal from potentiometer 21 related to the length of wire 1 is also supplied to multipliers 24 and 25. As can be easily seen from the Figure, the outputs of multipliers 22, 23 and 25 are signals related to:

$X = l \cos \alpha \cos\theta$
$Y = l \cos \alpha \sin \theta$
and
$Z = l \sin\alpha$, respectively.

The X and Y signals are fed to signal comparators 26 and 27, which are also connected to the first terminals of two dual pole switches 29 and 28. The common terminals of the switches 28 and 29 are each connected to one of two potentiometers 30, 31 in a reference unit 38. As the ship 1 reaches its docked position, the potentiometers 30, 31 are manually set so that the comparators 26 and 27 indicate no difference between the signals X and Y and the signals from the potentiometers 30, 31 thereby providing reference values along the $x$ and $y$ axes which will be denoted $X_o$ and $Y_o$. A similar dual pole switch 32 and potentiometer 33 in reference unit 38 allows the position along the Z-axis obtained from multiplier 25 to be calculated and set on potentiometer 33 by a servo motor 39 to provide a reference signal $Z_o$. The signals $X_0$, $Y_o$ define the required docked position of the ship 1 and signal $Z_o$ defines the height of the pivoted head 12 on the ship 1 above jetty 2.

After docking the switches 28, 29 and 32 are thrown; the second terminals of switches 28 and 29 are connected to dividers 34 and 35 which are also connected through a switch 36 to the potentiometer 33. The outputs of the dividers 34 and 35 are signals related to $X_o/Z_o$ and $Y_o/Z_o$ respectively. These signals are fed into multipliers 37 and 38 which multiply them by the instantaneous value of Z received through switch 32 from multiplier 25. The resulting signals are connected to comparators 27 and 26 where they are compared with the signals X and Y and any difference results in error signals $x_a$ and y. The factor $Z/Z_o$ allows for changes of the height of the pivoted head 12 with respect to jetty 2 as the ballast or tidal conditions change. A similar resolver unit 43 at position $b$ provides error signals $x_b$ and y. It is assumed that the y errors at positions $a$ and $b$ are equal, this commonly being found to be the case, to a first approximation.

Figure 5:
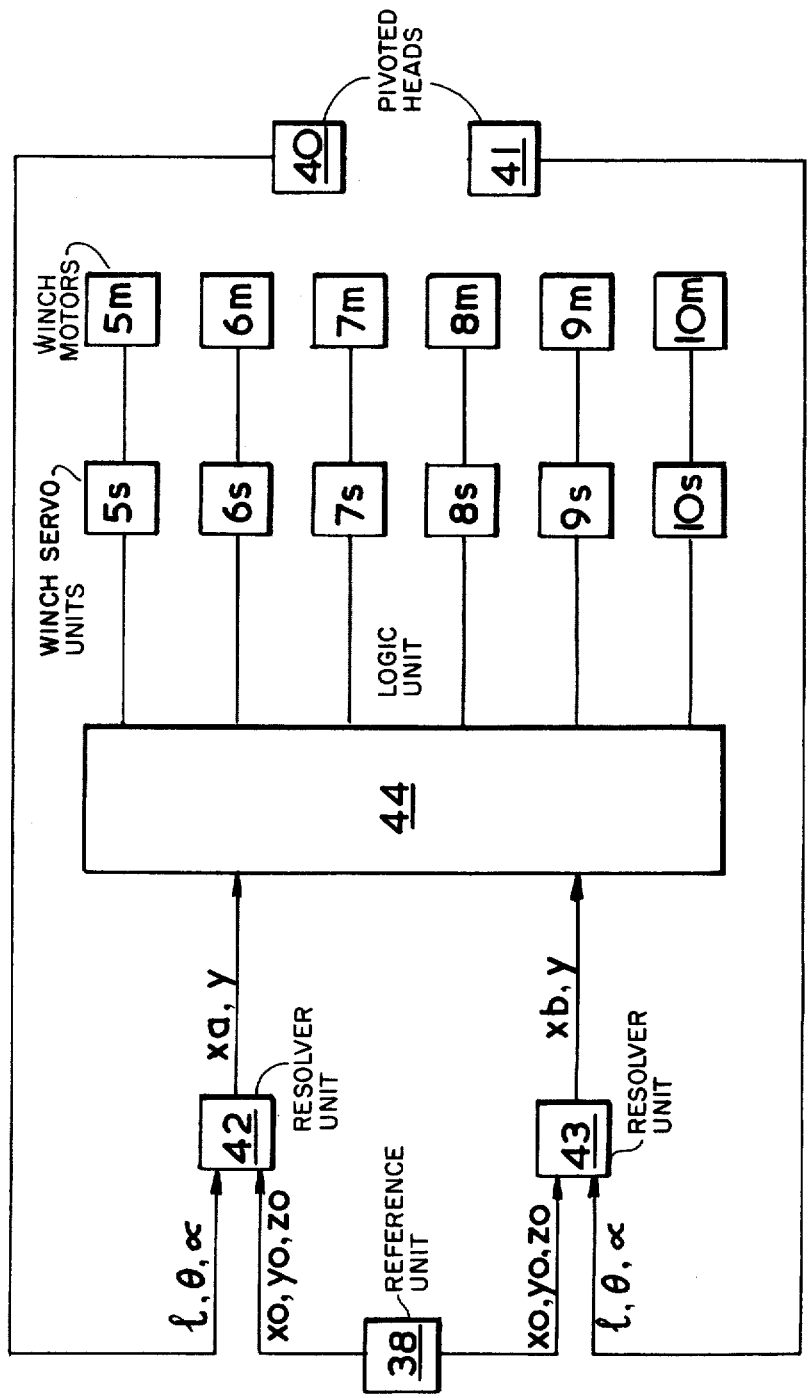
FIG. 5 illustrates schematically electrical connections between the pivoted heads, resolver units, logic unit and the ship's winches.

In FIG. 5, two pivoted heads 40, 41 which were described in detail with reference to FIG. 3 are shown connected to resolver units 42 and 43 which were described in detail with reference to FIG. 4. The resolvers 42, 43 are also connected to the reference unit 38, and the outputs of the resolvers 42, 43 are the error signals $x_a$, y and $x_b$, y respectively. The error signals are fed into a logic unit 44 of conventional type which determines the largest error signal and is arranged to pass heave or slack signals to the appropriate winch servo units 5s to 10s which control the winch motors 5m to 10m. As the winches heave or slack, the position of the ship 1 alters and the errors detected by the pivoted heads 40, 41 alter, thereby providing feedback to the logic unit 44.

As described in connection with FIG. 1B, 1C and 1D the selection of which winches should heave or slack to correct a positional error will vary with the mooring plan, and the logic circuit can be arranged to suit the mooring plan in use, eg by the use of plug boards or multiposition switches.

FIG. 6 illustrates a winch servo unit in which a winch 5 comprises a drum 46 on which is wound a mooring cable 3. The drum 46 is driven by a hydraulic transmission unit 47 connected to hydraulic supply and return lines 48 through a valve 49. Rotation of drum 46 is sensed by a sensing device 50 and cable tension is sensed by a tension sensing device represented diagrammatically at 51.

The logic unit 44 is connected to the valve 49 through a series of amplifiers 52A, B, C and D and the circuit is provided with a safety switch 53 controlled by tension sensing device 51 which releases valve 49 if the rope tension exceeds a manually pre-set level. The sensing device 50 provides a velocity feedback signal and a load measuring device 54 in transmission unit 47 provides a load feedback signal which reduce the heave rate if safe speed or load is exceeded. A tension reference unit 55 can be preset to a minimum tension and when this mimimum is reached a heave signal is produced.

Figure 7:
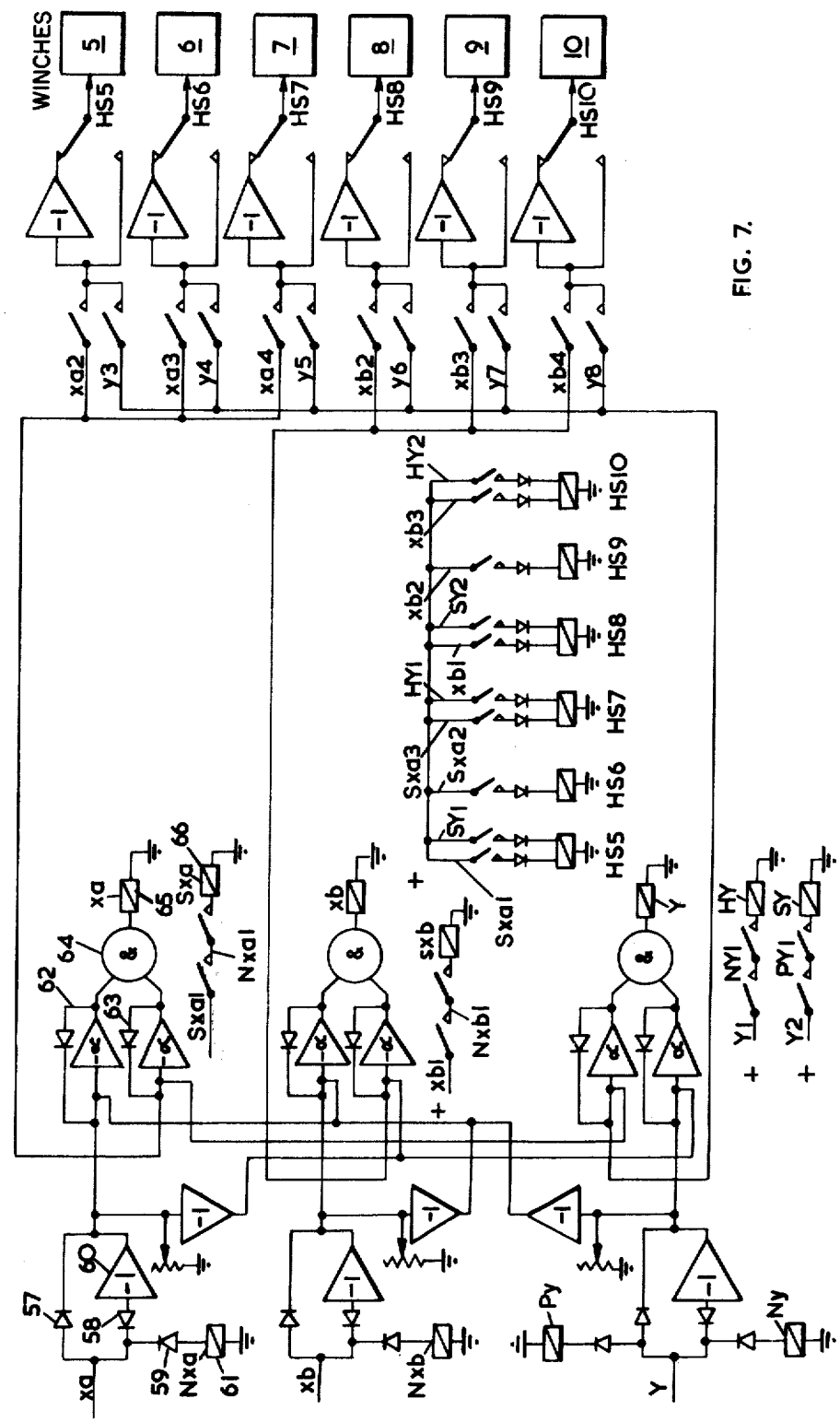
FIG. 7 illustrates the logic circuit.

In FIG. 7, three similar circuits are associated with the error signals $xa$, $xb$ and $y$ respectively.

The circuit associated with error signal xa comprises three diodes 57, 58 and 59, an inverting amplifier 60, a first relay 61 (N$xa$), two comparator circuits 62 and 63, an AND gate 64 and a second relay 65. The relay 61 (N$xa$) controls switch N$xa$1 and the relay 65 ($xa$) controls switches $xa$1 to $xa$4. Switches $xa$2, $xa$3 and $xa$4 are in series with winches 5, 6 and 7 respectively, switches $xa$1 and N$xa$1 are connected in series with a third relay 66 (S$xa$) which in turn controls switches S$xa$1 to S$xa$3 connected to relays HS5 to HS7. The relays HS5 to HS7 control corresponding switches connected to the winches 5, 6 and 7.

In operation the error signal $xa$ is fed in and if it is negative, relay 61 (N$xa$) operates its switch N$xa$1. The error signal is inverted by amplifier 60 is fed to the comparators 62 and 63 where it is compared with the errors $xb$ and $y$. If $xa$ is larger than both, AND gate 64 and relay 65 ($xa$) operate, closing switches $xa$2, $xa$3 and $xa$4 so that winches, 5, 6 and 7 are operated. Switch $xa$1 is also closed so that relay 66 (S$xa$) operates, controlling through relays HS5, HS6 and HS7 whether the winches 5, 6 and 7 should heave or slack.

The circuits to which error signals $xb$ and $y$ are applied are generally similar to the circuit described in relation to error signal $xa$. The relay P$y$ is included to take definite action when the error signal $y$ is positive, and eliminates the possibility that a negative signal too weak to operate the relay N$y$ could act as a positive signal. However, the relay P$y$ could be eliminated and a further contact of relay N$y$ used in its place.

As mentioned above, the logic circuit of FIG. 7 is suitable for use with the mooring plan shown in FIG. 1. For a different mooring plan, some alteration of the logic circuit would be needed.

Conveniently, manual override facilities can be provided, either near each winch or at a central control station, so that manual control of the winches can be arranged. In addition, by providing means to switch out the position error signals and to set the maximum and minimum tensions of each winch, an automatic tensioning system can be provided.

We claim:

1. A system for controlling the position of a moored floating vessel comprising a reference datum fixed relative to the moorings of said vessel, propulsion means capable of moving the vessel, logic means controlling the propulsion means, and position detecting apparatus for providing output signals related to any difference(s) between the actual position and heading of the vessel and the required position and heading in relation to said reference datum, the position detecting apparatus including a base fixable to the vessel, on said base a head pivoted so as to be able to turn in two planes mutually at right angles, a first means for producing output signals related in sign and magnitude to any change in angle of the pivoted head from a predetermined angle in either said plane, a cord having a first end so located that the cord can be guided so as to pass through said pivoted head and having a second end adapted to be fixed to said reference datum means for maintaining said cord in tension whereby the pivoted head can turn in response to any change in angular direction of the cord therethrough, a second means for producing an ouptut signal related to the length of any portion of the cord lying at any time between the second end thereof and the pivoted head, and means for feeding said output signals from the position detecting apparatus to the logic means to cause said logic means to so control the propulsion means that the position of the vessel is altered in such a manner that the difference(s) is reduced in magnitude.

2. A system according to claim 1 wherein said first means includes a first potentiometer driven by the pivoted head which can give an electrical output signal related to the angular direction of the pivoted head in a horizontal plane and a second potentiometer driven by the pivoted head which can give an electrical output signal related to the angular direction of the pivoted head in a vertical plane, and said second means includes a third potentiometer driven by the cord which can give an electrical output signal related to the length of any portion of the cord lying at any time between the second end thereof and the pivoted head.

3. A system according to claim 1 in which the reference detum is attached to a jetty or buoys and the propulsion means consists of a number of cables linking the vessel and the jetty or buoys and a corresponding number of power winches which can heave or slack the respective cables in conformity with control signals from the logic means, whereby the actual position and heading of the vessel is brought to and maintained at the required relationship to the reference datum.

4. A system according to claim 1 in which the reference datum is attached to a jetty or buoys and the propulsion means comprises the main porpulsion machinery of a vessel having at least two independently controllable driving propellors or jets, said logic means controlling the propulsion means whereby the actual position and heading of the vessel is brought to and maintained at the required relationship to the reference datum.

5. A system for controlling the position of a moored floating vessel comprising
a number of cables linking the vessel and a jetty or buoys and a corresponding number of power winches which can heave or slack the respective cables and thereby move the vessel,
a reference datum attached to the jetty or buoys,
logic means controlling the power winches,
and position detecting apparatus for providing output signals relating to any difference(s) between the actual position and heading of the vessel and the required position and heading in relation to the reference datum, the position detecting apparatus including
a base fixable to the vessel,
on said base a head pivoted so as to be able to turn in a horizontal and in a vertical plane,
first and second potentiometer means drivable by the pivoted head for producing electrical output signals related in sign and magnitude to the angular direction of the pivoted head in said horizontal and vertical planes respectively,
a cord having a first end so located that the cord can be guided so as to pass through said pivoted head and having a second end adapted to be fixed so said reference datum, means for maintaining said cord in tension whereby the pivoted head can turn in response to any change in angular direction of the cord therethrough, and third potentiometer means for producing an electrical output signal related to the length of any portion of the cord lying at any time between the second end thereof and the pivoted head, said position detecting apparatus being so arranged that said output signals are fed to the logic means to cause said logic means to operate the power winches whereby the position of the vessel is altered in such a manner that said difference(s) is reduced in magnitude.

* * * * *